June 29, 1954 R. A. RUNYAN 2,682,627
MOTOR POSITION CONTROL STATION ARRANGEMENT
Filed Jan. 25, 1949 4 Sheets-Sheet 1

RAYMOND A. RUNYAN
INVENTOR.
BY
ATTORNEYS

RAYMOND A. RUNYAN
INVENTOR.

Patented June 29, 1954

2,682,627

UNITED STATES PATENT OFFICE 2,682,627

MOTOR POSITION CONTROL STATION ARRANGEMENT

Raymond A. Runyan, South Glastonbury, Conn., assignor to Askania Regulator Company, Chicago, Ill., a corporation of Illinois Application January 25, 1949, Serial No. 72,708

7 Claims. (Cl. 318—18)

This invention relates to systems for position control of a motor through the medium of two transmitted single phase voltages, one of which is of variable phase and constitutes a signal voltage, while the other is of relatively constant phase, serving as a reference voltage with respect to phase of which the phase condition, which is to say the direction and degree of phase variation, of the signal voltage represents direction and distance from a neutral position of a position to be assumed by a repeater motor. Such a system may be used for producing a program of motion, or successive different positions, of a repeater motor substantially simultaneously with production of the signal voltage variations, or may be used for recording the signal and reference voltages for production at a later time of such a program, or for recording a program of movements of a mechanical element for subsequent reproduction of the program by a similar mechanical element operated by a repeater motor operation of which is controlled by a reproduction from the record of the signal and reference voltages.

Regardless of the specific purpose of such a system, as set forth in the above examples, a convenient mode of transmitting the signal and reference voltages, whether by direct conduction, radio, recording, or possibly by other modes, comprises using the respective voltages to modulate carrier voltages of sufficiently different frequencies as to permit ready separation at the repeater station, mixing such modulated carriers, and transmitting by a common channel, as a common line, common radio frequency, or a common record body bearing a recording of the mixed modulated carriers. It also is convenient in many fields of use of such systems to so arrange the station or stations so that they can serve equally well, as control stations to produce the reference voltage and the signal voltage, phase relation of which to the reference voltage indicates a required position of the repeater motor, and as repeater stations capable of translating the phase relation of the signal voltage to the reference voltage into a position of the repeater motor.

One very desirable type of system of the kind in question, for use in which the present invention is very well suited, is described in my co-pending application for United States Patent, Serial No. 72,707, filed January 25, 1949. As disclosed and claimed in such application, the variable phase signal is produced by a position to voltage phase translating device energized by a three phase power source, typified by a synchro control transformer, while a similar device is arranged at the repeater station. The single phase reference voltage, produced by a transformer connected across one phase of the synchro-energizing three phase supply, is translated at the repeater station into a three phase voltage for energizing the repeater synchro.

A primary object of the invention is the provision of a circuit arrangement forming a part of a repeater motor position control system, or a repeater motor motion program reproducing system, capable of conversion by a simple switching operation, from an arrangement capable of producing separate carrier frequencies, modulating such frequencies with applied voltages and mixing such modulated carrier frequencies to a pair of frequency-selective amplifiers and demodulating circuits capable of separating and demodulating mixed modulated carrier voltages of the frequencies that it is capable of producing.

Another object is the provision of a station, capable of acting as a control or transmitting station, including a position to signal voltage phase translating device and a reference voltage producing device, in cooperative association with means for producing separate carrier frequencies, modulating such frequencies respectively by the signal and reference voltages, and mixing such modulated frequencies, and also capable by a simple switching operation of conversion to a transmitting station also including in active condition the position to voltage phase translating device, in cooperative association with a repeater motor, circuit means for separating and demodulating by detectors carrier frequencies respectively modulated by reference and variable phase signal voltages, and motor control means responsive to phase difference between the detected signal and reference frequencies, through the medium of the translator.

Still another object is the provision of such a convertible station arrangement capable of utilizing a single, single phase power supply as an energizing source.

An additional object is the provision of a position control station arrangement for use in a recording and reproducing motion program control system, capable of use either as a recording or as a reproducing and repeater station.

In the accompanying drawings:

Fig. 1 is a diagram, partly schematic and partly block, showing an arrangement of a control or transmitting station embodying the invention.

Figs. 2 and 3 respectively are diagrams similar to Fig. 1, showing repeater station arrangements embodying the invention, and respectively using different types of motor position to voltage phase translating devices.

As suggested above, the invention is based on the concept of a circuit arrangement permitting conversion of a dual oscillator, modulator and mixer circuit arrangement to a selective amplifier, and demodulating circuit, and in one of its aspects the invention is directed to such an arrangement.

Figure 1:
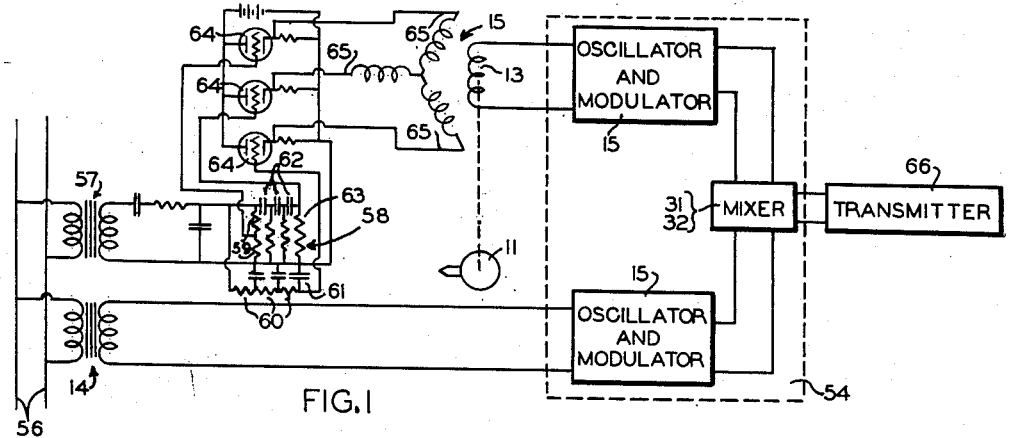
Figure 4:
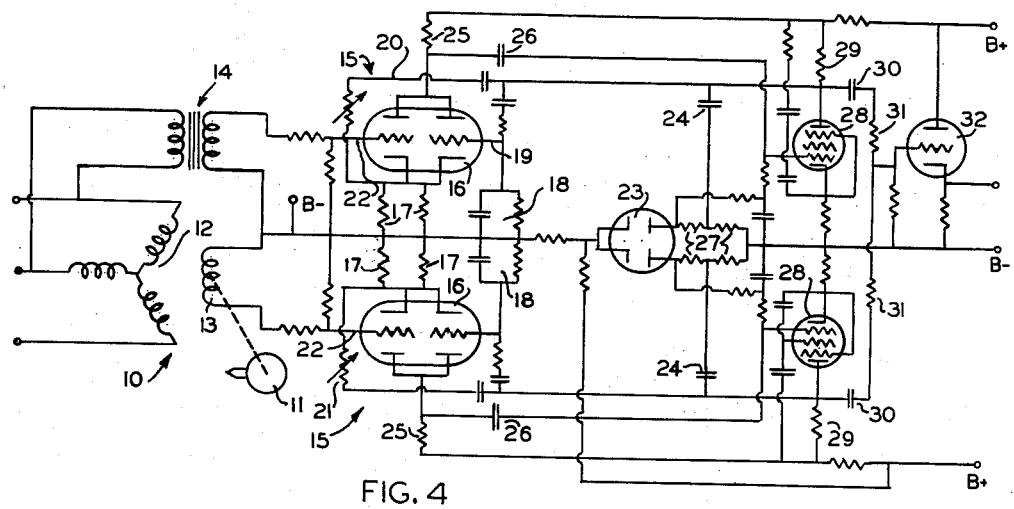
Fig. 4 is a schematic diagram of a circuit arrangement suitable for use at a control station, including reference and variable phase signal voltage generators, carrier frequency oscillators and modulators, and a mixer for conditioning the two voltages for transmission over a common channel.

Describing the drawings in detail, and first referring to Fig. 4, the control station therein shown includes a position to signal voltage phase translating device 10, actuated by a mechanical input device, shown in the form of a rotatable director member 11, the position of which determines the phase condition of a single phase output voltage of the device 10. As shown in Fig. 1, the translating device 10 comprises the well known arrangement of a synchro control transformer having a three phase primary winding 12 for energization by a source of three phase power, and a single phase secondary winding 13. The two windings 12, 13 are relatively rotatable, for example by the secondary being rotatable by the director member 11, the phase of the output voltage of the secondary winding relative to the energizing three phase primary voltage depending on the angular position of the secondary relative to the primary. The direction and degree of phase displacement between the two voltages therefore serves as an indication of the position of the director 11.

To render the signal voltage phase so representative of position in a situation or location at which the three phase voltage is not available for comparison purposes, a single phase reference voltage, with respect to which the phase of the signal voltage can be compared, is generated for transmission with the signal voltage. Conveniently, this reference voltage can be supplied by a transformer 14 having its primary connected across one phase of the energizing input to the primary three phase winding of the translating device 10.

To permit transmission of both signal and reference voltages over a common channel, they are used as modulating voltages for individual carrier voltages, of frequencies sufficiently different to permit subsequent separation, and the modulated carriers are mixed preliminary to transmission. In Fig. 4 the two carrier frequencies respectively are generated by oscillator-modulator sections 15.

The oscillating function of each section 15 is performed by a feedback bridge type arrangement of a dual tube 16, with a common cathode resistor 17, and a frequency-determining network 18 connected to the control grid 19 of the second tube section, and to the common cathode by a negative feedback line 20. The cathode resistance is of such value that the negative feedback applied to the cathode is sufficiently small that the gain of the circuit produces oscillation. This small value of cathode resistance is indicated in Fig. 4 by the parallel resistances 17, which distinguish the oscillator condition of the circuit from the tuned amplifier condition to be described later. A variable resistance 21 in the feedback line 20 determines amplitude of the negative feedback and may be used to adjust the circuit to an oscillating condition. The modulating voltages, outputs of the secondaries of the respective secondaries of the control and reference transformers 10 and 14 are applied to the control grids 22 of the first tube sections.

For stabilization of the oscillator-modulator sections 15, the outputs of the respective sections of a duo diode 23 are applied to the feedback lines 20 to the cathodes of tubes 16 through condensers 24, the diode sections being connected in usual delayed automatic volume control arrangement with the plate voltage outputs of the tubes 16 being coupled by resistance-capacity coupling 25, 26 to the diode plates, and the diode outputs being provided by divider resistances 27 connected between such plates and the B-line.

The outputs of the oscillator-modulator sections also are applied to the control grids of buffer amplifier tubes 28, the output plate voltages of which are by resistance capacity coupling 29, 30 applied to a mixing network of resistance 31, and the mixed modulated oscillator frequencies are applied to the grid of a mixing tube 32, connected as a cathode follower, the output of which comprises a voltage having components respectively conforming to the modulated carrier frequency outputs of the sections 15. Feedback also is provided from the plates of the tubes 28 to the negative feedback lines 20 of the sections 15.

The output of the tube 32 may be applied to any form of transmission device, such as a conductive line, a radio transmitter, or a recording device for forming a record of the voltage on a recording medium for reproduction at a subsequent time.

Figure 5:
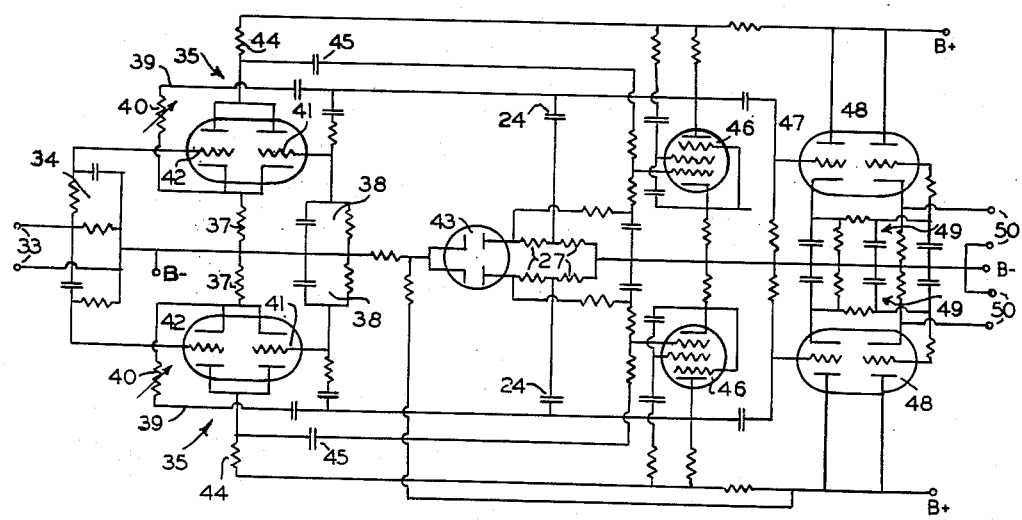
Fig. 5 is a schematic drawing of a repeater station circuit arrangement suitable for use with a transmitted voltage constituting the output voltage of a circuit arrangement such as shown in Fig. 1, or its equivalent.

Fig. 5 shows a circuit arrangement suitable for use with a voltage comprising mixed modulated carrier frequencies, for example the output of tube 32 of Fig. 1. Such voltage is applied to input terminals 33 of the circuit arrangement and to a filtering network 34 that assists the tuned amplifiers now to be described in separating the two modulated carrier frequencies.

It will be noted that the first three sections of the repeater circuit of Fig. 5 are substantially identical with the oscillator-modulator sections 15, diode 23 stabilizing section, and amplifier tube 28 section of Fig. 4. The first sections 35 of Fig. 5 comprise each a dual tube 36 connected in the same negative feedback bridge arrangement as shown in the oscillator-modulator sections 15 of Fig. 4, but with the exception that the cathode resistance is materially greater as indicated by the single cathode resistance 37. The increase of the value of the cathode resistances, as compared to the Fig. 4 arrangement, is sufficient to increase the feedback to a point preventing oscillation, and the sections 35 thereby are made to be tuned amplifiers, selective of frequencies determined by the networks 38, which in the respective sections are so tuned as to select the respective carrier frequencies that are components of the input voltages. As in Fig. 4, feedback is accomplished through lines 39 in which are connected variable resistances 40, the control grids 41 of the second tube sections being connected with the networks 38, and the input signal voltages, filtered to a certain extent by the network 34 being applied to the control grids 42 of the first tube sections.

As in Fig. 4, an automatic delayed automatic volume control duo diode 43 has its respective outputs coupled with the feedback lines 39 for stabilization of the tuned amplifier section 35. The plate voltages of the tuned amplifier sections 35 are applied by resistance capacity coupling at 44, 45 to the diode 43 input and to the control grids of amplifier tubes 46. The plate voltage outputs of these tubes similarly are applied to the input control grids 47 of dual tubes 48 connected as demodulators or detectors, having carrier frequency filtering cathode networks 49 and their second sections being connected as cathode followers. The outputs of these second sections, appearing across sets of terminals 50 are reproductions of the respective modulating voltages of the modulated and mixed carrier voltages applied as input to the terminals 33.

Figure 2:
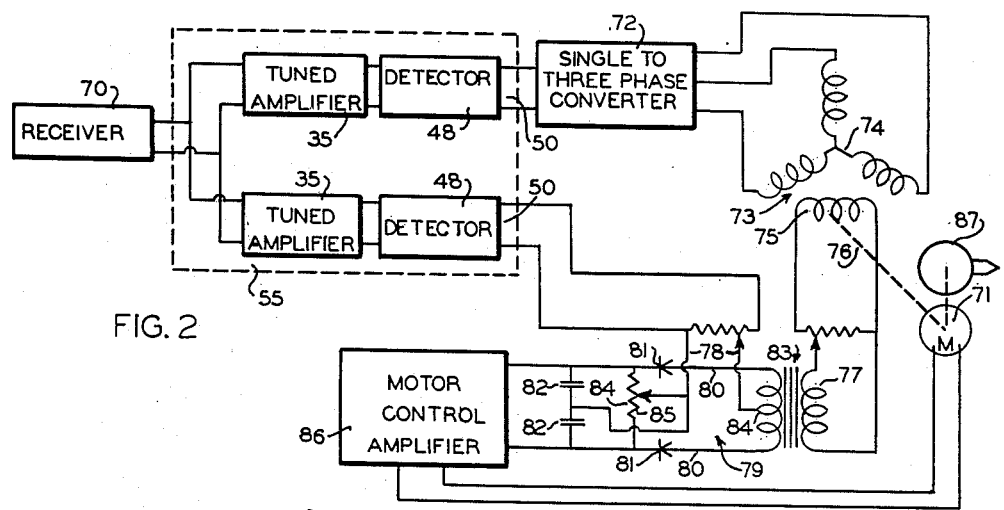

Figs. 1 and 2 respectively illustrate application of the circuits of Figs. 4 and 5 to control and repeater stations, the circuits in question respectively appearing in the blocks enclosed by the dotted lines 54, and 55.

A position to phase translating device ideally takes the form of a three phase energizing, primary or input circuit, and single phase secondary or output circuit, coupled in mechanically variable fashion, and so arranged that phase of the output single phase voltage varies with respect to an energizing three phase voltage, and that coupling is varied in accordance with the position to be represented by the output voltage phase. A synchro generator as shown in Fig. 4 is a typical, but not exclusive example of such a translator device. Fig. 1 discloses a system for conversion, at a repeater station, of a transmitted single phase voltage to a three phase voltage for application to the three phase energizing circuit of a position to voltage phase translator connected as an element in a repeater motor-controlling circuit. A similar expedient may be used to permit a transmitter or control station including a position to voltage phase translator requiring a three phase energizing input to be supplied by single phase power.

In the system of Fig. 1, power is supplied by single phase voltage lines 56. The output voltage of the secondary winding of a transformer 57, having its primary energized by the lines 56, is applied to the input of a phase-splitting system 58. This system 58 comprises an attenuation network of resistances 59, a phase delay network of cascaded phase delaying circuits each having an input resistance 60 and a condenser 61, and a phase advancing network of cascaded phase advancing circuits each having an input condenser 62 and a resistance 63. The outputs of these networks are connected respectively to control inputs of amplifiers, shown as amplifier tubes 64, the cathode follower outputs of which respectively are connected to the three input terminals 65 of a position to phase translating device shown as the synchro control transformer 15 of Fig. 4. As in Fig. 4, the single phase secondary winding 13 of the transformer 15 is rotatable by the mechanical input member or director 11. In Fig. 1, the reference voltage generator transformer 14 has its primary connected across the single phase power supply lines 56.

In operation, the arrangement disclosed by Figs. 1 and 4 serves to produce as the output of the mixer tube 32 a voltage that is the resultant of separately generated carrier voltages of frequencies sufficiently different to permit their ready separation, such carrier frequencies respectively modulated by a single phase reference voltage, output of a generator such as transformer 14, and by a single phase signal voltage of a variable phase, varying with respect to the reference voltage phase in accordance with variations in position of the director member 11, and phase condition of which relative to the reference voltage represents at any given instant an intended position of a repeater motor or device driven by a repeater motor. This output voltage of the system may be applied to a transmitter 66, which may be a direct conductive communication line, a radio transmitter, or a recording device for forming a record of the voltage on a body for future reproduction and repetition of the program of movement of the director 10 that resulted in the recorded signal voltage phase program.

Fig. 2 discloses a repeater station arrangement including the circuit arrangement of Fig. 5, such being enclosed by the dotted line 55 as already indicated. A receiver device 70 is of proper type for cooperation with a transmitter device, such as 66 of Fig. 1, and may be a direct conductive communication receiver, or a device for reproducing the input voltage to a radio transmitter, or to a recorder, such as 66 of Fig. 1. The tuned amplifier section 35 and detector sections 48 are as described relative to Fig. 5, and are so arranged that reproductions of reference and variable phase signal voltages representing a program of movement to be performed by a repeater motor 71 appears across the respective terminal sets 50. One of these reproduction voltages is applied to one to three phase converter circuit 72, which may be arranged similar to the corresponding circuit of Fig. 1, and the three phase output of which is applied to the three phase primary circuit of a position to voltage phase translating device. The device is shown at 73, as a synchro control transformer, having a three phase primary winding 74, energized as stated by the converter 72, and a rotatable, single phase secondary winding 75, driven by the repeater motor 71 through a mechanical connection 76. The output of the secondary winding 76, and the output of the second detector 48 respectively are applied to the two inputs 77 and 78 of a phase comparison or phase discriminating circuit 79. The circuit 79 may be of any form capable of producing an output voltage that varies in sense and magnitude from a neutral condition representing a predetermined phase relation of two input voltages, in accordance with direction and degree of departure of the input voltages from such relation. As shown, the circuit 79 comprises parallel branches 80, each containing a rectifier 81 and an output condenser 82. Input 77 is provided by a transformer 83, the secondary of which is connected in series with the two branches, the input 78 by center taps 84 respectively of the secondary of transformer 83 and of a resistance 85 connected across the branches on the output sides of the rectifiers 81. This circuit arrangement provides a balance of the voltages of condensers 82 when the input voltages are 90° out of phase, and an output voltage of polarity corresponding to direction, and magnitude proportional to degree of departure of the input voltages from such relation. A neutral condition of the input voltages in 90° phase disagreement may be supplied to indicate a neutral position of the motor by various means. One such means is a preliminary adjustment of transmitter director as 11, and variable element as 13 of the transmitter position to phase translator, to produce the 90° phase disagreement of the reference and signal voltage when the director is in a neutral or zero position. Alternately, use may be made of phase shifters at the transmitter or receiver stations to translate a condition of phase agreement between reference and signal voltages to a condition of 90° phase disagreement at the discriminator inputs. Another method is to so arrange the motor control circuit that the voltage output of the discriminator circuit, when its input voltages are in phase, serves as a neutral position signal.

As the above suggests, the output voltage of the discriminator circuit 79 is applied to a motor control, power amplifier 86, which may be any of widely varying and well known types controlling a motor to operate it in a direction corresponding to sense of an input signal voltage, and in some instances at a speed proportional to the magnitude of such system. In Fig. 2, the amplifier 86 so controls repeater motor 71, to operate it in a direction so to vary the coupling between the secondary and primary circuits of the position to voltage phase translating device as to reduce and eventually cancel a variance from neutral condition of the phase relation between the signal and reference voltage outputs of the two detectors 48, and thereby bring the motor to a position represented by the particular variance from neutral condition of the reference and signal voltage reproductions.

The motor 71 may drive a member 87 that is to be positioned by, or that is to follow a program of motion described by the director element of the cooperating transmitting station.

Figure 3:
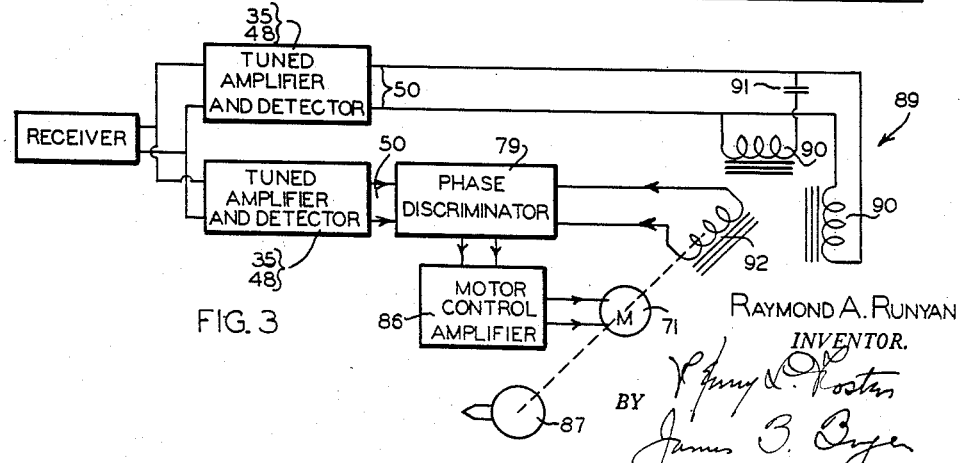

In the repeater station arrangement of Fig. 3, a different position to voltage phase translation device 89 is shown, comprising a single phase primary circuit of two transformer primaries 90 arranged in physical 90° angular relation, energized by a common voltage, and one having a phase-shifting condenser 91 series connected in its supply. In this arrangement, the secondary circuit comprises a secondary winding 92, and the two primary and single secondary windings relatively are axially rotatable, the secondary being shown as rotatable and driven by the repeater motor 71 through a mechanical connection 76. The circuit arrangement, is such that the output, at 50, of one of the detectors 48 is applied direct to the primary circuit of the translator device 89. Otherwise the circuit may be identical with that of Fig. 2.

Figure 6:
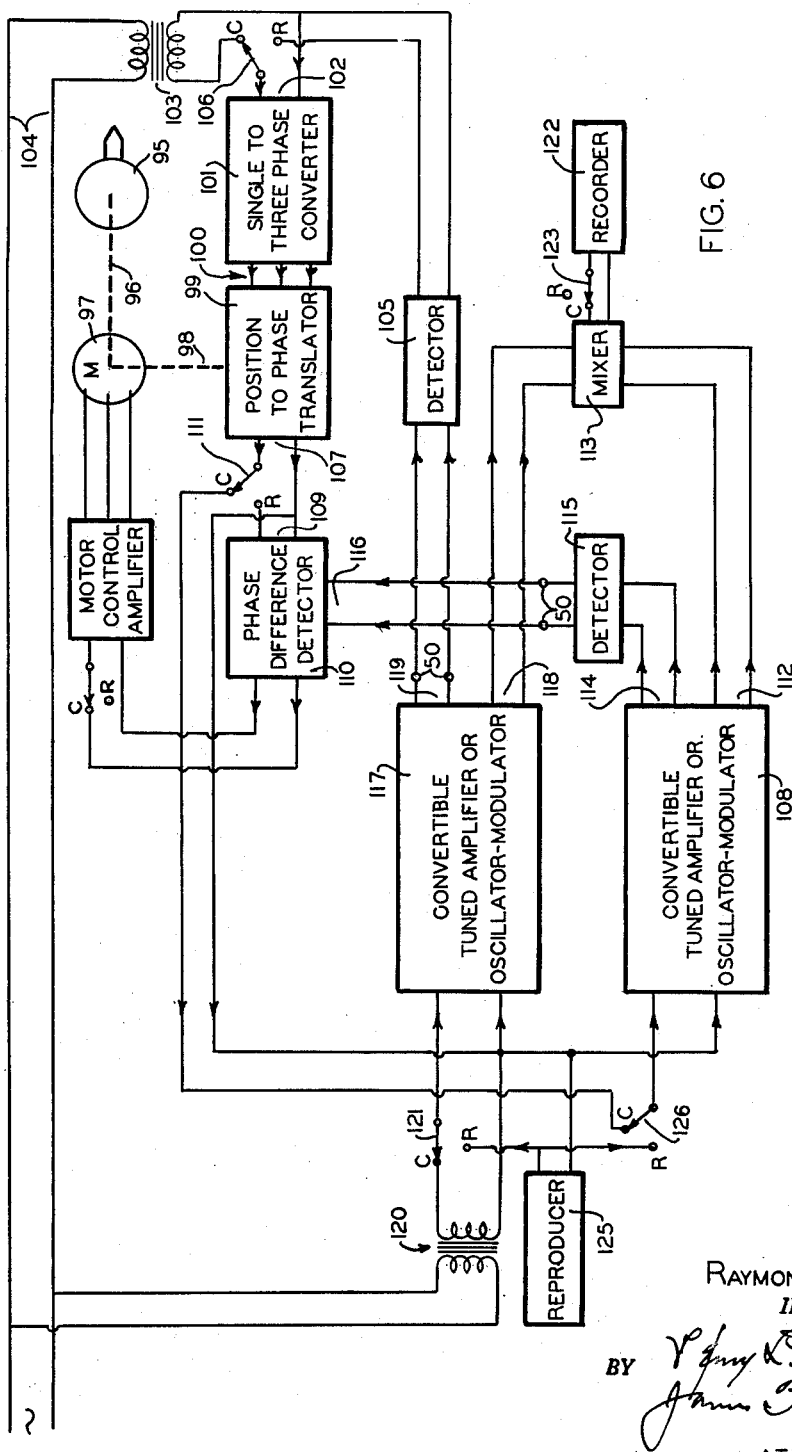
Fig. 6 is a block and schematic diagram of a station arrangement suitable for conversion from a control to a repeater station.
Figure 7:
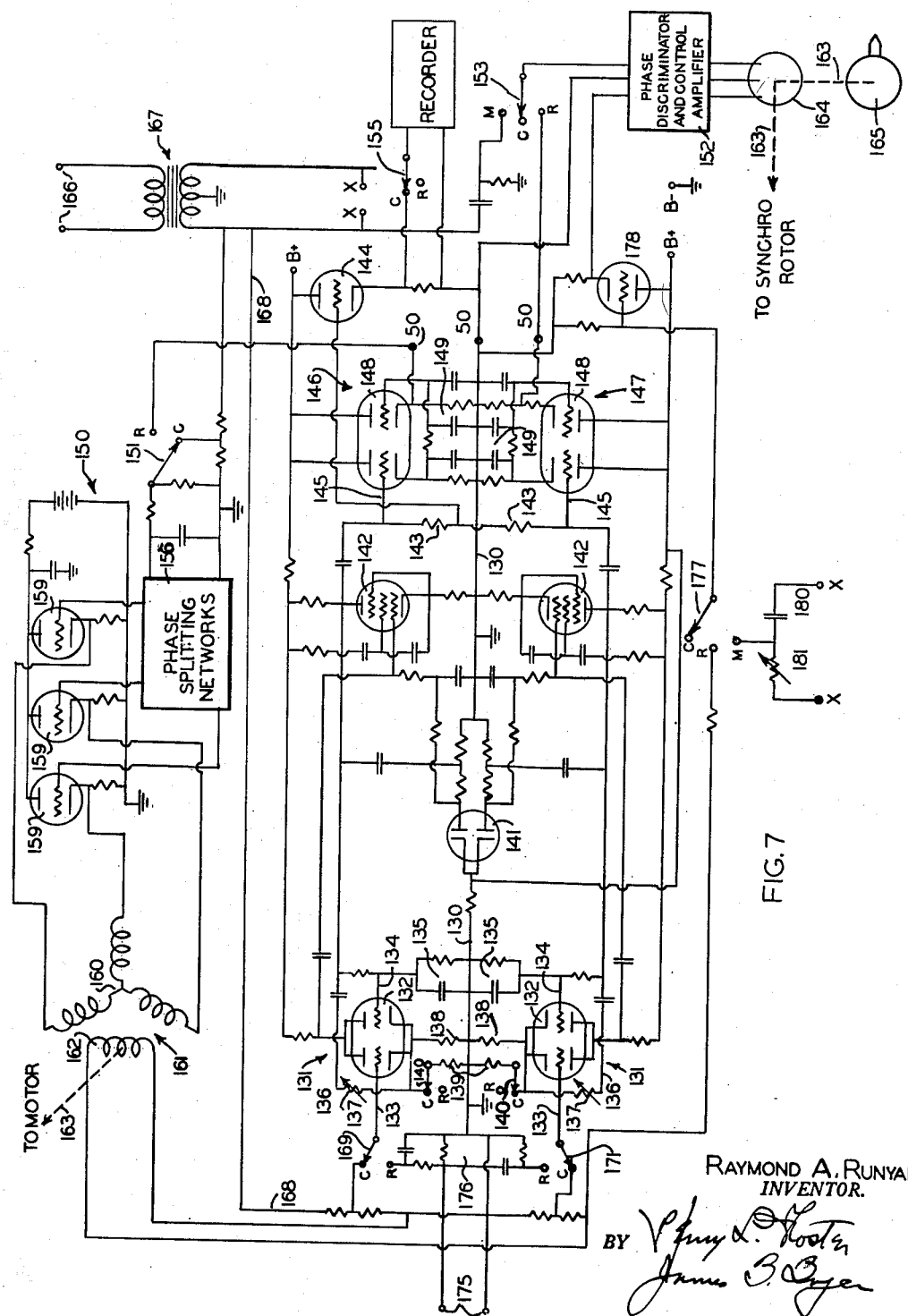
Fig. 7 is a schematic diagram of circuit arrangements permitting use of certain circuits for both control and repeater functions and convertible from one to the other by a simple switching action, and also discloses a manually controlled repeater motor-driving circuit.

By reason of employment of tuned amplifier, stabilization, and amplifier or buffer sections 35, 43, and 46 of the repeater circuit of Fig. 5, that respectively are practically or completely identical with the oscillator modulator, stabilizing and amplifier or buffer sections of the transmitter station of Fig. 4, the system is made capable of conversion between control and repeater arrangements by simple switching operation. The presence of the single to three phase converter for energizing the primary circuit of a position to voltage phase translator device contributes to this dual capacity of the circuit arrangement that permits a station to serve either for control or repeating. Figs. 6 and 7 disclose a complete station arrangement permitting such dual use.

Referring first to Fig. 6, a movable element 95 constitutes a mechanical input when the station is used for control, and a mechanical output when the station acts as a repeater. The element 95 is mechanically coupled by a two way drive connection 96 to a motor 97, that acts as a repeater when the station is in that service. Both motor 97 and element 95 are mechanically coupled, by a drive connection 98 to the mechanical input of a position to voltage phase translator device 99, which may be of any suitable kind, such as a synchro control transformer, and which for purpose of illustration is considered as having a three phase primary circuit input at 100. This input is connected to the output of a single phase of three phase voltage converter circuit 101.

The circuit 101, which may be similar to that disclosed by Fig. 1, has a single phase input 102 that may be connected either to the secondary winding of a transformer 103, the primary of which is energized from single phase alternating current supply lines 104, which is the case when the station is used as a control station, or, when the station is to be used as a repeater, to a detector 105 that corresponds to one of the detectors 48 of Figs. 2 and 4. Such alternate connection may be accomplished by means of a single pole double throw switch 106.

The output 107 of the single phase secondary circuit of the translator 99 is alternately connectable, for control station operation to the input of a circuit 108, and for repeater station operation to one of the inputs 109 of a phase difference detector or phase discriminating circuit 110, by a double throw, single pole switch 111. The circuit 108, by means which will be described in connection with Fig. 7, is convertible between tuned amplifier and oscillator-modulator arrangements which respectively are employed when the station is operated for control and for repeater purposes. Its oscillator-modulator output 112 is applied to a mixer circuit 113, while its tuned amplifier output 114 is applied to a detector circuit 115 the output of which is applied to the second input 116 of the discriminator 110 for comparison with the output of the translator device 99.

A second convertible tuned amplifier or oscillator modulator circuit 117 has its tuned amplifier output 118 connected with the mixer circuit 113, and its tuned amplifier output 119 connected with the detector 105 that supplies the three phase input of the translator 99 through converter circuit 101. When in control station service to the input of the circuit 117 which is then in oscillator-modulator condition, is applied a reference voltage, output of the secondary winding of a transformer 120, the primary of which is energized from the power lines 104. A double throw single pole switch 121 controls application of such voltage.

During control station operation, reference and signal voltages being applied to the inputs of circuits 117 and 108, and the arrangement of such circuits then being those of Fig. 4, the mixer 113 will produce a voltage representing both carrier frequencies modulated respectively by the reference and signal voltage, phase condition of the latter relative to the former being determined by the position of the element 95 through operation of the position to voltage phase translator device 99. This output may be applied to a suitable transmitter, shown in Fig. 6 as a recorder 122. A single pole single throw switch 123 may control application of the mixer output voltage to the transmitter.

In repeater station operation, the circuits 108, 117 are arranged, as in Fig. 5, as oscillator modulator circuits, by means which will be described in connection with Fig. 7. Switch 111 is in condition connecting the position to phase translator output 107 to the discriminator input 109, and disconnecting output 107 from the input of convertible circuit 108. The reference voltage output of transformer 120 is disconnected from the input of circuit 117 by switch 121, being thereby open circuited. The output voltage of a receiver device, shown as a record reproducer 125, is applied to the inputs of both tuned amplifier circuits 108, 117, to the latter by a second contact of switch 121, and to the former by a double pole double throw switch 126, the second contact of which is in series with the control station contact of the switch 111. The receiver, exemplified by reproducer 125, but which equally well can be a direct conductive communication system, or a radio receiver, is designed to have a voltage output similar to the output of a transmitter device such as 66 of Fig. 1, representing combined different carrier frequency voltages modulated by reference and signal voltages. The amplifier circuits 108 and 117 are tuned to accept the frequencies of the two carriers. As will be apparent, the use of the same circuits as oscillators and as tuned amplifiers contributes to the convertible nature of the station by providing oscillator and tuned amplifier circuits operating at identical frequencies.

Turning to Fig. 7, it will be seen that the complete system contains sections corresponding to each section of Figs. 4 and 5, certain of the sections of Fig. 7 corresponding to sections of both of Figs. 4 and 5. In Fig. 7 the two duplicate sets of sections respectively above and below the cathode return or B-lines 130 respectively correspond to circuits 117, 105 and 113, and to circuits 108 and 115, of Fig. 6.

The first of each of these sections comprises a bridge type feedback section 131, including a dual tube 132 to the control grid 133 of the first section of which the input voltage is applied. The control grid 134 of the second section of each tube 132 is connected to a frequency determining network 135, which is also connected through a negative feedback line 136, including a variable resistance 137 to the cathode. Parallel cathode resistances 138, 139, common to both tube sections, have a combined value to render the sections 131 non-oscillating due to degenerative feedback to the cathodes. The selected value of the resistance 137, determines the oscillating or non-oscillating function of the circuit with a given value of cathode resistance. Conversion of the section from an oscillator to a tuned amplifier is accomplished by increase of the common cathode resistance to a value at which negative feedback reduces the gain of the circuit to a point insufficient to produce oscillation. This increase of cathode resistance is accomplished simply and positively, and by a single switching operation by a switch 140, by means of which the second cathode resistance 139, can be disconnected for non-oscillating, tuned amplifier action of the section, or connected for reduction of the cathode resistance and consequent increase of the section gain to an oscillating condition.

The second section of each of the two circuit systems, comprising the two sections of the stabilizing diode 141 corresponds precisely to the arrangement of Figs. 4 and 5, and functions in the same manner in both arrangements of the convertible circuits. The same numerals are applied to this section in Figs. 4, 5 and 7, with the exception of the diode.

As in each of Figs. 4 and 5, the outputs of the sections 131 are applied to amplifier buffer tubes 142. The outputs of these tubes are applied both to a mixing circuit of a network of resistances 143 and a mixer tube 144, as in Fig. 4, and to input control grids 145 of demodulator or detector sections 146 and 147 that respectively correspond to the detector circuits 105 and 115 of Fig. 6, to the section of tubes 28 of Fig. 4, and to the detector circuits 48 of Fig. 2. Each of these demodulator sections 146, 147 comprises a dual tube 148 with its sections connected in cascade and a carrier frequency filtering network 149. The second sections of the tubes are connected as cathode followers, and their outputs appear across the terminals 50. One such output is connectible to the input of a single to three phase converter 150 through a single pole double throw switch 151 that corresponds to switch 111 of Fig. 6, while the other is connectible to phase difference detecting or phase discriminator and motor control amplifier circuits 152 through a single pole triple throw switch 153. This switch 153 has no equivalent in Fig. 6.

The output of the mixer tube 144, shown connected as a cathode follower, is applied to the transmitter, shown as recorder 154, through a single pole single throw switch 155, that corresponds in part to the switch 111 of Fig. 6.

The single to three phase converter 150 may be, and is shown as being the same as the converter circuit of Fig. 1, including a phase-splitting, attenuation, advancing and retarding system 156, that may be arranged as the system 58 of Fig. 1, and the three phase outputs of which respectively control cathode follower tubes 159 that supply the three phase primary winding 160 of a position to phase translator 161 shown as a synchro control transformer, and corresponding to the translator 15 of Fig. 1 and 99 of Fig. 6. The rotatable element of the translator 161, shown as its single phase secondary winding 162 is driven, as through a mechanical connection 163, by a repeater motor 164 during repeater station operation, or by a mechanical member 165 during control station operation. These last two elements respectively correspond to the motor 87 of Fig. 2 and 97 of Fig. 6, and to the director member 11 of Fig. 1, the driven mechanical output member 87 of Fig. 2, and the member 95 of Fig. 6.

During control station operation, energizing voltage for the position to voltage phase translating device 161, and a reference voltage, are provided by a single phase alternating current source 166, through a transformer 167. The reference voltage is supplied to the control grid of one of the tubes 132 of the stage 131 by way of a line 168 and a single pole double throw switch 169, corresponding to switch 121 of Fig. 6. The energizing voltage is supplied to the translating device 161 via the single to three phase converter 150, by a line 170 and switch 151. During control station operation, the output voltage of the position to phase translator 161 is applied from the secondary winding 162 to the tube 132 of the other section 131 through a double pole, single throw switch 171 that corresponds in part to switch 111 and in part to switch 126 of Fig. 6, insofar as the latter two switches are arrangeable to couple the circuit 108 to the translator 99. All of the switches 140, 151, 153, 155, 169, and 171 are shown in control station operation positions, the contacts closed by such positions being designated C.

For repeater station operation, switches 140, 151, 153, 155, 169 and 171 are thrown from control station to repeater positions, the contacts therein closed being designated R. Such throw of switches 169 and 171 serves to connect the input control grids of the tubes 132, with input terminals 175 which are connected with the output of an appropriate receiver, such as the reproducer 125 of Fig. 6. Such connection is made through an input filter network 176 that partially filters the applied composite voltage and assists the discriminating action of the sections 131, which then are in tuned amplifier arrangement due to disconnection of the supplemental cathode resistors 139 by the switches 140. Throw of the motor control connecting switch 153 to repeat contact R, connects the circuits 152 to the output of the demodulating section 147, and similar throw of the single to three phase converter input switch 151 connects the converter circuit 150 to the output of the demodulating section 146.

Still referring to repeater station operation, the output of the position to phase translator secondary circuit 162, being disconnected from the amplifier stage 131 by throw of switch 171 to its R contact, application of such output to the phase discriminator circuit is controlled by a switch 177, which also is thrown from a disconnect control or C contact to an R or repeater contact. This switch applies the translator output voltage to the control grid of a cathode follower amplifier tube 178, the output of which is applied to the second input of the phase discriminator circuit.

The operation of the circuit arrangement in both its control and repeater arrangements, the mode of conversion of the stage 131 between oscillator-modulator and tuned amplifier operation, and the manner of cooperation of the convertible circuit with other station components all contribute to provision of a station suitable for either control or repeater operation will be readily understood from the above description.

Relative to the convertible circuit itself, it is to be noted that the plates and cathodes of the double tubes are connected parallel. This arrangement permits isolation of the signal input by connection of the frequency determining network to the control grid of the second tube section and of the signal input to the control grid of the first section. This permits the use of the section of an oscillator-modulator circuit when the shunting of resistances 139 across the cathode resistances 138 has reduced the negative feedback applied to the cathodes sufficiently to permit oscillation of the circuit, and to permit the circuit to function as a tuned amplifier when removal of the shunt cathode resistor has raised the negative cathode feedback to an extent preventing oscillation.

In Fig. 7 is shown provision, additional to the disclosure of Fig. 6, for manual position control of the repeater motor 164. A phase shifting network including condenser 180 and variable resistance 181 is connected across the secondary of the transformer 167, as indicated by the corresponding reference letters X. By means of a third contact M of switch 177, a point intermediate condenser 180 and resistance 181 may be connected with the control grid of the cathode follower tube 178, and so applied to one of the inputs of the phase discriminator circuit. At the same time, switch 153 is thrown to a third contact, also designated M. This contact connects the second input of the discriminator circuit with the output of the transformer 103 to act as a reference voltage with respect to which the voltage output of the tube 178 may be varied by manual operation of the variable resistance 181. In this manner, a manually variable signal voltage is substituted for the voltage output of the demodulator stage 146. Recording or transmission may be made of such a manually controlled voltage if desired, by placing the system in its control condition, operation of the motor 164 serving to drive the synchro rotor 162 and the system to produce an output of combined reference and signal modulated carrier frequencies as described.

I claim:

1. In a motor position control station for selective use as a control or as a repeater station, comprising a repeater motor, a mechanically operable director member, a motor control system having two voltage inputs and arranged to operate the motor upon departure of two voltages applied to its inputs from a predetermined relation in a direction determined by direction of such departure, a position to voltage condition translator device arranged to produce a variable output voltage and having a mechanical input operable by said director member and repeater motor to vary such voltage in proportion to variations in positions of said director and motor, and a reference voltage generator with respect to the output of which the output voltage of said translator device may vary; in combination, a pair of circuits each including frequency determining means which in the respective circuits are tuned to different frequencies, said circuits being convertible between oscillator-modulator and tuned amplifier operating conditions, means for applying to said circuits carrier voltages of the frequencies to which their frequency determining means respectively are tuned and modulated respectively by a reference voltage and a signal voltage that may vary with respect to such reference voltage, switch means for selectively applying to said convertible circuits either such carrier voltages or to the convertible circuits respectively the outputs of the position to voltage translator device and reference voltage generator, a transmitter device for transmitting the modulated carrier frequency outputs of the convertible circuits in their oscillator-modulator condition, and means for selectively connecting to the outputs of said convertible circuits the inputs of the motor control system or the transmitter.

2. In a motor position control station for selective use as a control or as a repeater station, comprising a repeater motor, a mechanically operable director member, and a motor control system having two voltage inputs and arranged to operate the motor upon departure of two voltages applied to its inputs from a predetermined phase relation in a direction determined by direction of such departure, a position to voltage phase translator device arranged to produce a variable phase output voltage and having a mechanical input operable by said director member and repeater motor to vary the phase of such output voltage in proportion to variations in position of said director and motor, a reference voltage generator with respect to the output of which phase of the output voltage of the translator device may vary; in combination a pair of circuits each including a frequency determining network which networks are tuned to different frequencies, said circuits being convertible between oscillator-modulator and tuned amplifier operating conditions, means for applying to said circuits carrier voltages of the frequencies to which the respective networks are tuned and modulated respectively by a reference voltage and a variable phase voltage, switch means for selectively connecting to said convertible circuits said carrier voltage applying means or the output voltages of the position to phase translator device and reference voltage generator, a transmitter device for transmitting the modulated carrier frequency outputs of the convertible circuits in their oscillator-modulator operating condition, and means for selectively connecting to the outputs of said convertible circuits the inputs of the motor control system or the transmitter.

3. A motor position control station for selective use as a control or as a repeater station comprising; a repeater motor, a signal generator having a mechanical input member and a variable voltage output and arranged to vary the voltage output in proportion to variations in the position of the mechanical input member, a director element for operating said mechanical input member, a motor control amplifier having a signal voltage input and an output arranged to drive the motor in a direction determined by the condition of a signal voltage applied to said input, a transmitter, an amplifying stage having an input for selective application of either the output of the signal voltage or a carrier frequency voltage modulated by a signal voltage, said stage having a gain sufficient to produce oscillation, frequency determining means, and negative feedback means variable between conditions respectively permitting and suppressing oscillation, switch means for selecting the condition of said feedback means, and means for selectively applying the output of said stage to the motor control amplifier or the transmitter.

4. A control station arrangement for producing carrier voltages of different frequencies respectively modulated by a reference voltage and a voltage the phase of which varies with respect to that of the reference voltage to indicate a position, comprising; a mechanically movable director member, a position to voltage phase translating device comprising an output circuit for producing a variable phase voltage and mechanical means operated by said director member for determining the phase condition of such output voltage by the position of the director member, means for generating a reference voltage, a pair of circuit each comprising an amplifier stage including dual tube sections having independent control grids and common cathode resistance, a frequency determining network connected with the control grid of one section and by a negative feedback connection with the cathode end of said resistance, said networks of the two circuits being respectively tuned to the different carrier frequencies and the amplifier stages having sufficient gain to oscillate, and means for applying independently to the control grids of the other sections of the amplifying stages of the respective circuits the outputs of the position to voltage phase translator and reference generator.

5. In a repeater motor control amplifier-driving arrangement for operation by two carrier voltages of different preselected frequencies that respectively are modulated by a reference frequency and by a variable phase signal frequency of which the phase relation to the reference frequency is representative of required position of a repeater motor; a phase discriminator circuit having two voltage inputs and arranged to produce an output voltage of sense corresponding to sense of variance of two voltages applied to said inputs from a preselected phase relation; a tuned amplifier section including two amplifier circuits, each comprising dual tube sections having common cathode resistance and independent control grids, and a frequency determining network connected with the control grid of one said section and by a negative feedback connection with the cathode end of said resistance to suppress oscillation, the networks of said amplifier circuits respectively being tuned to the different carrier frequencies; and circuit means for applying to the control grids of the other tube sections of the respective amplifier circuits such carrier voltages.

6. In a motor position control station for selective use as a control or as a repeater station, comprising a repeater motor, a mechanically operable director member, a motor control system having two voltage inputs and arranged to operate the motor upon departure of two voltages applied to its inputs from a predetermined relation and in a direction determined by sense of such departure, a position to voltage condition translator device arranged to produce a variable output voltage and having a mechanical input operable by said director member and repeater motor to vary such voltage in proportion to variations in positions of said director and motor, and a reference voltage generator with respect to the output of which the output voltage of said translator device may vary; in combination: a pair of circuits each including a frequency determining network which networks are tuned to different frequencies, said circuits being convertible between oscillator-modulator and tuned amplifier conditions and each comprising an amplifier stage having sufficient gain to oscillate at a frequency determined by its said network, negative feedback means variable between conditions respectively permitting oscillation for modulator operation of the circuit and suppressing oscillation for modulator operation of the circuit and suppressing oscillation for tuned amplifier operation thereof, and means for selecting the condition of said feedback means; means for applying to said circuits a pair of carrier voltages of the respective frequencies to which said networks are tuned and said carrier voltages respectively being modulated by a reference voltage and a signal voltage in the manner of variation of the output voltage of said translator device; switch means for selectively applying to said circuits during said tuned amplifier operating condition said carrier voltages, or applying to the different ones of said circuits during said oscillator-modulator operating condition the outputs of said translator device and reference voltage generator; transmitter means for transmitting the modulated carrier frequency output of said circuits during their oscillator-modulator operation; and means for selectively connecting to the outputs of said circuits the inputs of said motor control system or said transmitter means.

7. In a motor position control station for selective use as a control or as a repeater station, comprising a repeater motor, a mechanically operable director member having two voltage inputs and arranged to operate the motor upon departure of two voltages applied to its inputs from a predetermined relation and in a direction determined by sense of such departure, a position to voltage condition translator device arranged to produce a variable output voltage and having a mechanical input operable by said director member and repeater motor to vary such voltage in proportion to variations in positions of said director and motor, and a reference voltage generator with respect to the output of which the output voltage of said translator may vary; the combination of claim 6, wherein each of said pair of circuits comprises an amplifier including dual tube sections having common cathode resistance and sufficient gain to oscillate, said frequency determining networks of the respective circuits are connected between the control grids of one section of each thereof and the cathode end of said cathode resistance of the same amplifier, the control grids of the other sections of the same amplifier are arranged for application of said modulated carrier frequency or said translator device and reference generator output voltages.

References Cited in the file of this patent

UNITED STATES PATENTS

| Number | Name | Date |
|---|---|---|
| 2,183,725 | Seeley | Dec. 19, 1939 |
| 2,256,482 | Isbister et al. | Sept. 23, 1941 |
| 2,363,941 | Busignies | Nov. 28, 1944 |
| 2,414,795 | Brandt | Jan. 28, 1947 |
| 2,433,195 | Bond | Dec. 23, 1947 |
| 2,439,844 | Davis | Apr. 20, 1948 |
| 2,475,245 | Leaver et al. | July 5, 1949 |
| 2,552,721 | King | May 15, 1951 |